(12) United States Patent
Wood et al.

(10) Patent No.: US 7,941,962 B2
(45) Date of Patent: May 17, 2011

(54) WATERFOWL DECOY WITH STABILIZING BUOYANCY ATTACHMENT

(76) Inventors: Michael Tate Wood, Cordova, TN (US);
Bobby L. Windham, Jr., Olive Branch, MS (US)

(*) Notice: Subject to any disclaimer, the term of this patent is extended or adjusted under 35 U.S.C. 154(b) by 51 days.

(21) Appl. No.: 12/290,119

(22) Filed: Oct. 27, 2008

(65) Prior Publication Data

US 2009/0126253 A1  May 21, 2009

Related U.S. Application Data

(60) Provisional application No. 61/000,522, filed on Oct. 26, 2007.

(51) Int. Cl.
*A01M 31/06* (2006.01)
(52) U.S. Cl. .................................................. 43/3
(58) Field of Classification Search ............... 43/3, 2
See application file for complete search history.

(56) References Cited

U.S. PATENT DOCUMENTS

| | | | | | |
|---|---|---|---|---|---|
| 351,709 | A | * | 10/1886 | Nye | 43/3 |
| 814,097 | A | * | 3/1906 | Tartsch | 43/3 |
| 836,823 | A | * | 11/1906 | Oliver et al. | 43/3 |
| 934,342 | A | * | 9/1909 | Oliver et al. | 43/3 |
| 1,444,342 | A | * | 2/1923 | Godward | 43/3 |
| 1,469,188 | A | * | 9/1923 | Moore | 43/3 |
| 1,673,479 | A | * | 6/1928 | Allen | 43/3 |
| 1,708,762 | A | * | 4/1929 | Hudson | 43/3 |
| 1,789,649 | A | * | 1/1931 | Gazecki et al. | 43/3 |
| 1,806,456 | A | * | 5/1931 | Haigler | 43/3 |
| 1,923,442 | A | * | 8/1933 | Kilgore | 43/3 |
| 2,201,164 | A | * | 5/1940 | Fox | 43/3 |
| 2,237,194 | A | * | 4/1941 | Ohnmacht | 43/3 |
| 2,342,107 | A | * | 2/1944 | Agius | 43/3 |
| 2,391,475 | A | * | 12/1945 | Newhardt | 43/3 |
| 2,495,721 | A | * | 1/1950 | Heymann | 43/3 |
| 2,523,811 | A | * | 9/1950 | Buehl | 43/3 |
| 2,539,727 | A | * | 1/1951 | Clark | 43/3 |
| 2,564,890 | A | * | 8/1951 | Fox | 43/3 |
| 2,622,360 | A | * | 12/1952 | Bertram | 43/3 |
| 2,719,376 | A | * | 10/1955 | Risch | 43/3 |
| 2,814,898 | A | * | 12/1957 | Fluke et al. | 43/3 |
| 2,816,383 | A | * | 12/1957 | Locher | 43/3 |
| 2,817,918 | A | * | 12/1957 | Phillips | 43/3 |
| 2,942,370 | A | * | 6/1960 | Zaruba | 43/3 |
| 3,047,972 | A | * | 8/1962 | Taylor | 43/3 |
| 3,055,134 | A | * | 9/1962 | Archer | 43/3 |
| 3,704,538 | A | * | 12/1972 | Gagnon | 43/3 |
| 3,798,820 | A | * | 3/1974 | Dye | 43/3 |
| 3,888,032 | A | * | 6/1975 | Gagnon | 43/3 |
| 3,896,578 | A | * | 7/1975 | Franceschini | 43/3 |
| 4,435,913 | A | * | 3/1984 | Messina | 43/3 |
| 4,450,642 | A | * | 5/1984 | DeKezel et al. | 43/3 |
| 4,651,458 | A | * | 3/1987 | Lanius | 43/3 |

(Continued)

*Primary Examiner* — Darren W Ark
(74) *Attorney, Agent, or Firm* — Ober, Kaler, Grimes & Shriver; Royal W. Craig (57) ABSTRACT

Provided is a waterfowl decoy that includes a suction bottom main body in combination with a removable keel. The main body includes extensions on the bottom that are within the cavity, and the keel includes corresponding slots to slideably engage the extensions. The keel also includes a hollow ballast section with an opening for insertion of desired ballast material. The keel is brought into contact with the bottom of the main body and the extensions are slid into the slots. This invention allows for quick, selectable attachment or removal of the keel in the field. The keel also includes a structure for the attachment and wrapping of an anchor cord.

11 Claims, 6 Drawing Sheets

U.S. PATENT DOCUMENTS

| | | | |
|---|---|---|---|
| 4,757,630 A * | 7/1988 | Torberg | 43/3 |
| 4,827,653 A * | 5/1989 | Sewell | 43/3 |
| 5,003,718 A * | 4/1991 | Lenert et al. | 43/3 |
| 5,172,507 A * | 12/1992 | Franceschini | 43/3 |
| 5,207,757 A * | 5/1993 | Franceschini | 43/3 |
| 5,461,816 A * | 10/1995 | Gazalski | 43/3 |
| 5,832,650 A * | 11/1998 | Franceschini | 43/3 |
| 5,992,078 A * | 11/1999 | Willis | 43/2 |
| 6,339,895 B1 * | 1/2002 | Lawson | 43/3 |
| 6,357,161 B1 * | 3/2002 | Best | 43/3 |
| 6,543,176 B1 * | 4/2003 | McGhghy | 43/3 |
| 6,640,413 B1 * | 11/2003 | Martin et al. | 43/3 |
| 6,647,657 B2 * | 11/2003 | Igo | 43/3 |
| 6,748,690 B2 * | 6/2004 | Igo | 43/3 |
| 7,337,575 B2 * | 3/2008 | Hulley et al. | 43/3 |
| 7,347,024 B1 * | 3/2008 | Vest | 43/3 |
| 7,409,793 B1 * | 8/2008 | Schwarz | 43/3 |
| 7,568,305 B2 * | 8/2009 | Fanfelle | 43/3 |
| 7,634,867 B2 * | 12/2009 | Bill | 43/3 |
| 7,730,656 B2 * | 6/2010 | Hulley | 43/3 |
| 2003/0226307 A1 * | 12/2003 | Hulley et al. | 43/3 |
| 2005/0016053 A1 * | 1/2005 | Hulley et al. | 43/3 |
| 2005/0108918 A1 * | 5/2005 | Franceschini | 43/3 |
| 2005/0252067 A1 * | 11/2005 | Wade | 43/3 |
| 2006/0162228 A1 * | 7/2006 | Sieman | 43/3 |
| 2006/0283071 A1 * | 12/2006 | Haley | 43/3 |
| 2009/0272020 A1 * | 11/2009 | Bill | 43/3 |
| 2010/0011650 A1 * | 1/2010 | Leonards, Sr. | 43/3 |
| 2010/0115819 A1 * | 5/2010 | Sieman | 43/3 |

* cited by examiner

WATERFOWL DECOY WITH STABILIZING BUOYANCY ATTACHMENT

CROSS-REFERENCE TO RELATED APPLICATIONS

The present application derives priority from provisional application 61/000,522 filed on Oct. 26, 2007, which is incorporated herein by reference.

BACKGROUND OF THE INVENTION

1. Field of the Invention

The present invention relates to waterfowl decoys for hunting and wildlife photography purposes. More particularly, the present invention relates to suction bottom decoys with removable keels.

2. Description of the Background

Waterfowl decoys have long been used by hunters and wildlife photographers to create an artificial yet realistic floating flock of birds to attract the desired waterfowl into close proximity to the hunters or photographers. Increasing the realistic appearance of each decoy and the overall flock of decoys increases the chances of attracting actual birds. The appearance of a decoy on the water is influenced by how the decoy floats on the water, including how the decoy moves in response to wind and wave conditions. Decoys need to remain generally where placed to maintain the desired flock grouping and to not float away randomly. In addition, each decoy should remain upright and should move slightly in response to gentle winds or waves without excessive and unrealistic bobbing.

The floating decoys are launched into water from a shoreline or boat, often being tossed into a desired pattern. In order for the decoys to assume an upright position, there are both weighted keels and water keels. A water keel is a keel that is open at one or both ends to allow water to collect and weigh the decoy down, yet when the hunter collects the decoys after the hunt, the water can be easily drained. With a weighted keel, weight (metal shot, sand, etc.) is placed along the bottom of the decoy or in a keel that extends from the bottom of the decoy into the water. For purposes of the present disclosure, the term "weighted keel" encompasses both water keels and traditional weighted keels. In both cases, the weighted keel is heavier than the body of the decoy so that the decoy, upon being tossed into the water, will self-right. In addition, a weighted tether or anchor cord can be attached to the keel to anchor each decoy to a point on the bottom of the body of water. The anchor cord prevents decoys from drifting away or breaking formation, and the weighted keel provides resistance to excessive bobbing or movement under windy conditions. Under light wind conditions, however, the weighted keel inhibits motion in the decoy that would otherwise appear natural. Additionally, because the keels extend downward from the bottom of the decoys, these keels are not suitable for shallow water applications, such as small pools of water that may be found in low lying wooded areas adjacent streams or lakes, or large shallow tidal flats.

In contrast to keeled decoys, suction bottom decoys may be used. These decoys have a hollow cavity on the bottom that forms a suction attachment with the surface of the water. The suction attachment allows the decoys to move slightly in a gentle wind, creating a more realistic appearance.

Therefore, using conventionally available decoys, a variety of decoys are needed for variable water and weather conditions. Increasing the number of decoys increases costs. Further, when traveling to remote areas that contain a variety of sites and water conditions for a multi-day hunt or photography shoot, the need for a variety of different decoys suited for all possible and unanticipated variables becomes increasingly, if not prohibitively, cumbersome. Therefore, a single waterfowl decoy is desired that can be readily and easily modified on-site or in the field to handle different water and weather conditions.

SUMMARY OF THE INVENTION

Accordingly, it is an object of this invention to provide a waterfowl decoy that realistically resembles live waterfowl in both appearance and movement.

Another object is to provide a waterfowl decoy that is easily modified for use in various water and weather conditions.

These and other objects are accomplished with waterfowl decoys in accordance with the exemplary embodiments of the present invention that combine a main body having a suction bottom, and a keel that is attachable to the suction bottom of the main body. An attachment mechanism that can repeatedly and easily attach the keel to the main body is used. This attachment mechanism also allows for quick and easy removal of the keel from the main body. Therefore, the keel is removable and selectively attachable to the main body so that the waterfowl decoy can be easily modified in the field for current water and weather conditions. In addition, the same keel can be attached to a number of different main bodies having the corresponding attachment mechanism. In one embodiment, a securing mechanism is provided for the attachment mechanism so that once the keel is attached to the main body, and the decoy is deployed on the water, the keel will not readily detach from the main body.

In addition to the attachment mechanism, the keel includes a ballast section. The ballast section is spaced a sufficient distance from the bottom of the main body to lower the center of gravity of the main body to produce a self righting decoy. In one embodiment, the ballast section includes a hollow interior and an opening through the wall of the ballast section into the hollow interior. This opening allows the hollow interior to be filled with a ballast material such as sand or metal shot. A water tight closure, e.g., a screw type closure, is provided in the opening to create a water tight seal for the hollow interior and to retain the ballast material. The keel can also include an eyelet to attach one end of an anchor cord and a cord winding section to store the anchor cord when the decoy is not being used.

BRIEF DESCRIPTION OF THE DRAWINGS

Other objects, features, and advantages of the present invention will become more apparent from the following detailed description of the preferred embodiment and certain modifications thereof, in which.

DETAILED DESCRIPTION

Figure 1:
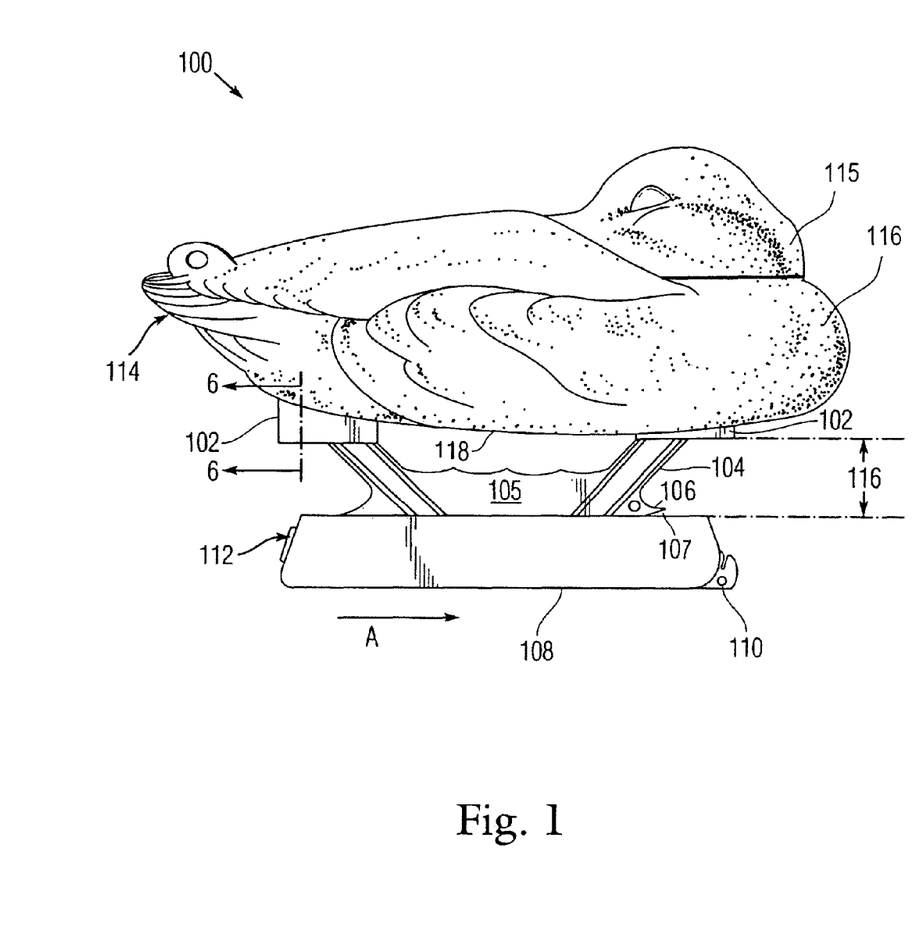
FIG. 1 is a side perspective view of a waterfowl decoy with stabilizing buoyancy attachment according to the present invention.

Referring initially to FIG. 1, an exemplary embodiment of a suction bottom decoy with removable keel 100 is illustrated. A main body 114 is provided in the shape of a desired waterfowl or bird in a desired pose as is understood and known to those of skill in the art. The main body 114 may be provided in a variety of body styles. The shape and texture of the bird's body, head, and feathers and any coloring scheme applied to the main body 114 are a matter of design choice. The main body 114 is buoyant and constructed of molded polystyrene or other suitable plastics or polymers. Additionally, the main body 114 can be constructed of real or synthetic wood materials that are easily carved. Suitable materials and methods for forming these materials into a buoyant decoy body are generally known and available to those of skill in the art.

The head 115 of the main body 114 may be a separate component mounted to the main body 114. For example, the head 115 may be separately molded with an integral post protruding downwardly from the neck, and the body 116 may be molded with a conforming recess to seat the post. The post may be formed with side-protruding ribs or tabs that engage corresponding notches in the main body recess to secure the head thereon, and yet the head remains pivotal and/or removable. A removable head 115 minimizes shipping costs because packing a loose head in the box requires much less space. A pivoting head can be rotated to give each decoy its own unique look and to give a spread of multiple decoys a less uniform appearance.

A removable keel 112 is selectively attached beneath the main body 114. The removable keel 112 includes at least one and preferably a plurality of slot elements 102 of the attachment mechanism and a ballast section 108 having an eyelet 110 for attachment of an anchor cord.

Figure 2:
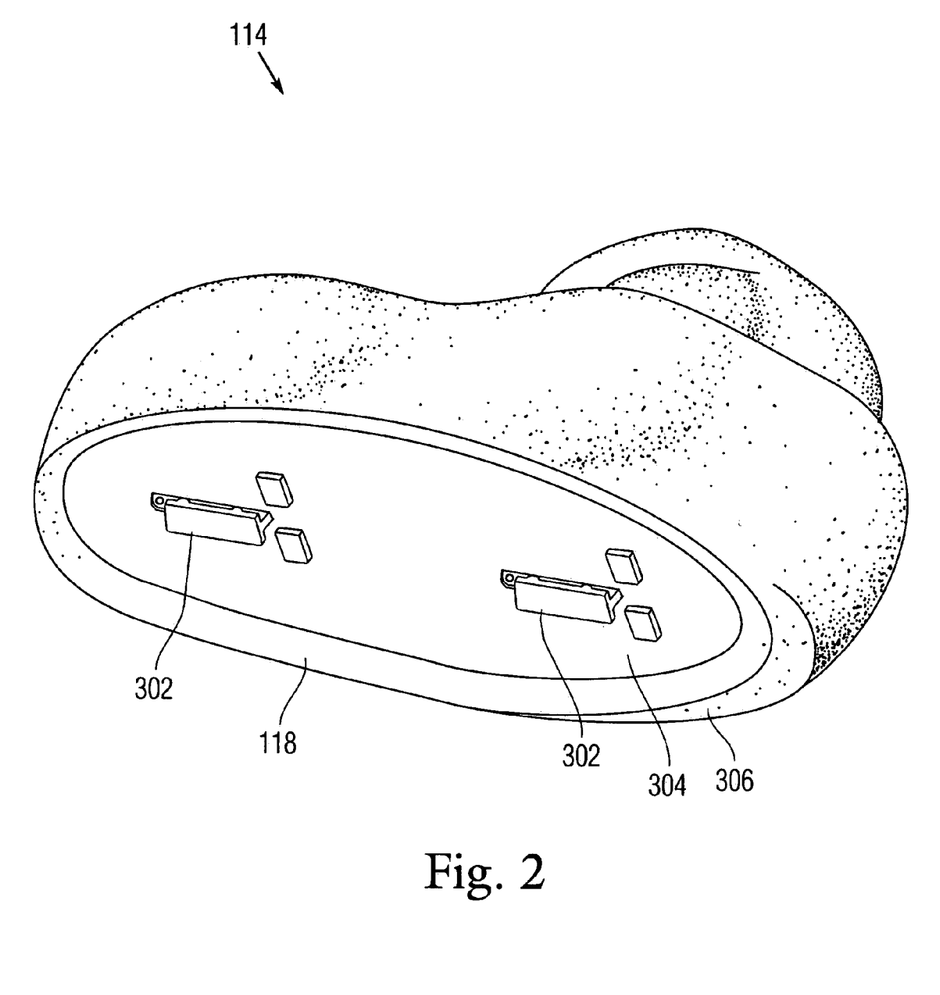
FIG. 2 is an underside perspective view of the waterfowl decoy as in FIG. 1.

As shown in FIG. 2, the main body 114 is a suction body having at least one cavity 304 on the bottom 118 of the main body 114. As used herein, the bottom 118 of the main body 114 is the portion of the main body 114 that generally lies along the water line on which the decoy is resting. This cavity 304 includes a rim 306 that extends completely around the cavity. When the suction bottom decoy is placed in the water, the rim 306 contacts the surface of the water, trapping a volume of air within the cavity 304 under the main body 114. This forms a suction that holds the decoy generally upright on the surface of the water. However, the decoy can still move across the water under the influence of gentle winds and waves, yielding a realistic movement pattern. In the illustrated embodiment, the rim 306 is a flat area having a width of up to about 1 inch. This width provides greater contact area with the water for improved sealing, which decreases the opportunity for the seal to be broken due to the motion of the main body 114. The cavity 304 is sized to provide sufficient suction to hold the decoy upright and to prevent excessive bobbing. Although illustrated as a single cavity, one skilled in the art will understand that the bottom 118 of the main body 114 might alternatively have a plurality of distinct and separate cavities spaced across the bottom.

Also on the bottom 118 of the main body 114 is an attachment mechanism for attaching the removable keel 112 thereto. In the presently preferred embodiment, the attachment mechanism comprises one or more tongue-in-groove extension element(s) 302 on the bottom 118 of the main body 114 engaged with one or more corresponding slot element(s) 102 on the removable keel 112, thereby securely attaching the removable keel 112 to the main body 114. A plurality of extension elements 302 uniformly spaced along the bottom 118 of the main body 114 are preferred to evenly spread the weight or load of the removable keel 112 across the main body 114. As a result, the main body 114 will float evenly on the surface of the water and will not exhibit an unnatural lean, either side to side or front to back. As illustrated, the extension elements 302 are spaced inline along the center of the main body 114. One skilled in the art should understand that other attachment configurations may be used without departing from the scope or spirit of the invention. For example, suitable attachment mechanisms may include, but are not limited to, hook and loop type fasteners, threaded posts, nuts, wing nuts, quick release fasteners, mating post, socket fasteners, pressure fit fasteners, slot and hook type fasteners, threaded hole and screw type fasteners, magnetic fasteners, and combinations thereof.

Figure 3:
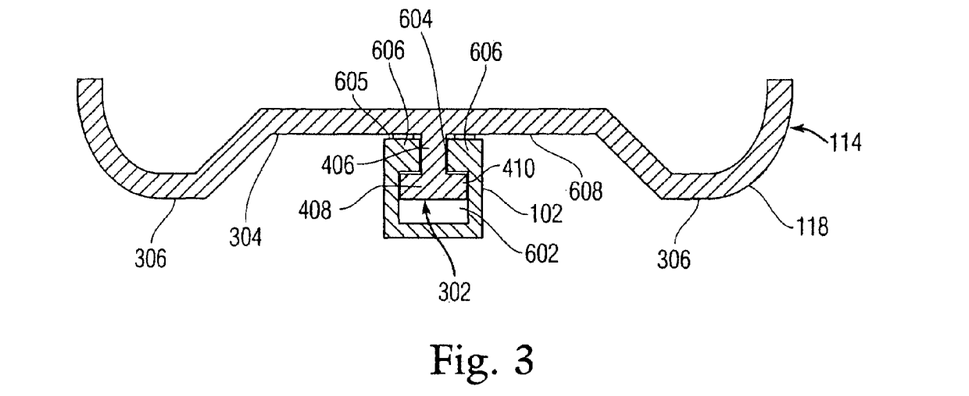
FIG. 3 is a cross section of the attachment mechanism with a partial view of the attached keel.
Figure 4:
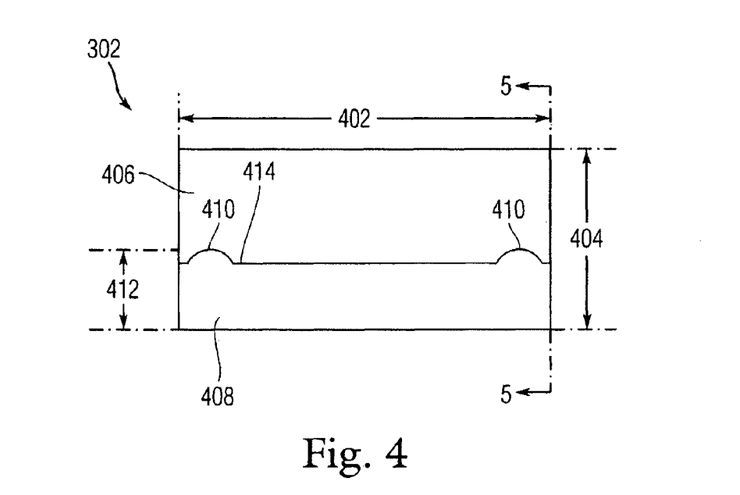
FIG. 4 is an enlarged side view of the extension element of the attachment mechanism that extends from the bottom of the main body of the waterfowl decoy as in FIGS. 1-2.

As seen in FIGS. 3-4, the extension element 302 and slot element 102 provide for slideable and removable engagement of the keel 112 to the main body 114. More specifically, the extension element 302 is a flange section in the shape of an inverted "T," having a vertical or downwardly extending first portion 406, extending generally perpendicularly from the bottom 118 of the main body 114. Although these extension elements 302 can be bonded or attached to the bottom 118 of the main body 114, preferably, they are formed as one with the main body 114. In the illustrated embodiments, the extension elements 302 are located within the cavity 304 on the bottom 118 of the main body 114. At the end of the first portion 406, opposite the bottom of the main body, is a second portion 408 that extends perpendicularly on both sides of the first portion 406. The overall height 404 of the extension element 302 is selected to securely attach the removable keel 112 to the main body 114 and preferably does not extend beyond the rim 306 of the cavity 304 so as not to interfere with the suction attachment of the main body 114 when the decoy is deployed without the keel 112. The length 402 of the extension element 302 can be varied up to about 1 or 2 inches and generally is selected to provide for sufficient support of the removable keel 112.

As best seen in FIG. 4, the top 414 of the second portion 408 is a contact surface that provides for slideable engagement of the extension element 302 within the slot element 102 on the removable keel 112, and which keeps the extension element 302 captive therein. In one embodiment, extending from the top 414 of the second portion 408 is at least one and preferably a plurality of ribbed protrusions 410 that serve to provide frictional engagement with the slot element 102. Each protrusion is rounded, beveled, or semicircular in cross section to facilitate the sliding of the slot element 102 over the extension element 302. The overall thickness 412 of the second portion 408 and the protrusions 410 is selected to provide sufficient frictional engagement between the extension element 302 and the slot element 102.

Each slot element 102 comprises a slot 602 and an aperture 604 that corresponds to the cross-sectional shape of the extension element 302. In one embodiment, the slot element 102 is a boxed shaped member having a slot 602 and an elongated top aperture 604 that runs along a top face 605 of the slot element 102. The length of the slot element 102, the slot 602, and the aperture 604 corresponds to the length 402 of the extension element 302. As illustrated in FIG. 3, the slot 602 and aperture 604 are shaped to accept the extension element 302. Specifically, the aperture 604 is sized to accept the first portion 406 of the extension element 302, and the slot 602 is sized to accept the second portion 408 of the extension element 302.

The slot 602 and aperture 604 are open on at least one end of the slot element 102 to facilitate insertion of the extension element 302 into the slot element 102. Preferably, the slot 602 and aperture 604 are open on two opposing ends of the slot element 102. The top face 605 of the slot element 102 is in contact with the roof 608 of the cavity 304. The aperture 604 in combination with the slot 602 forms a shoulder 606 on either side of the aperture 604 that is engaged between the roof 608 of the cavity 304 and the second portion 408 of the extension element 302. The shoulders 606 are sized to provide sufficient frictional contact between the second portion 408 of the extension element 302, in particular, the protrusions 410 extending from the second portion 408, and the roof 608 of the cavity 304. Therefore, the removable keel 112 is securely attached to the bottom 118 of the main body 114 without excessive motion or movement between the keel 112 and main body 114.

Returning to FIG. 1, the slot element 102 is attached to at least one and preferably a plurality of brackets 104 connected to the ballast section 108. The presently preferred removable keel 112 includes two brackets 104 supporting one ballast section 108. In this embodiment, the ballast section 108 comprises a hollow interior 804 (FIG. 8) that can hold ballast material. Suitable ballast material includes, but is not limited to, sand, metal shot, or water. Extending from the ballast section 108 is at least one eyelet 110 that is preferably a circular hole sized to accept and to attach an anchor cord to the removable keel 112. An eyelet 110 can be formed at one or both ends of the removable keel 112 depending on design choice.

The brackets 104 can be in direct contact with the ballast section 108. The brackets 104 are preferably sized so that the ballast section 108 is spaced a sufficient distance 116 from the bottom 118 of the main body 114 to lower the center of gravity of the combined main body and keel 100, thus producing a self righting combined main body and keel 100, i.e., it will turn upright when tossed into a body of water. In the present embodiment, the brackets 104 connect to a central structure 105 that is attached to the ballast section 108. The central structure 105 also serves as a cord wrap for the anchor cord, i.e., it is wider near the brackets 104 and the ballast section 108 than it is at the center. The central structure 105 also includes a tang 106 that forms a gap 107 for frictional engagement and securing of the anchor cord after being wrapped about the central structure 105. Overall, the central structure 105 is shaped to have a slim profile from the front to the back and a minimal side structure profile. Therefore, the central structure 105 will allow water to pass through and under the main body 114, minimizing the tendency of the water to push the combined main body and removable keel 100 sideways.

In operation, the removable keel 112 is attached to the main body 114 by engaging the slot element 102 of the attachment mechanism with the extension element 302. The slot 602 and aperture 604 of the slot element 102 are aligned with the extension element 302, particularly the first portion 406 and the second portion 408, and the removable keel 112 is moved in a direction parallel to arrow A (FIG. 1) to engage the slot element 102 with the extension element 302. Sufficient space is provided within the cavity 304 so that the slot element 102 can be properly aligned with the extension element 302. Removal of the keel 112 is accomplished by moving the keel 112 in the opposite direction parallel to arrow A.

Figure 5:
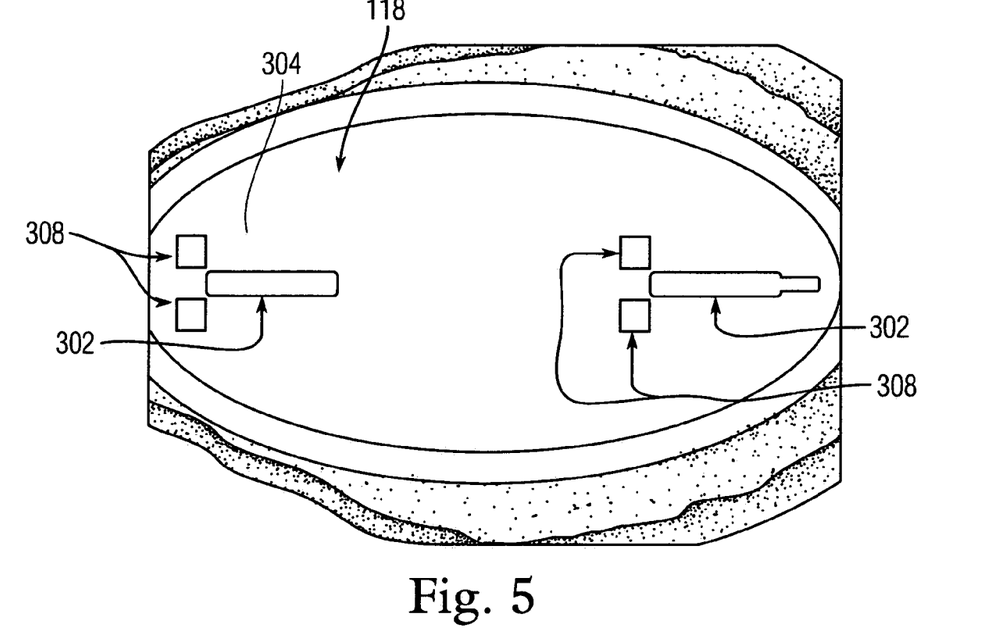
FIG. 5 is an underside perspective view of an exemplary embodiment of the waterfowl decoy as in FIG. 1.
Figure 6:
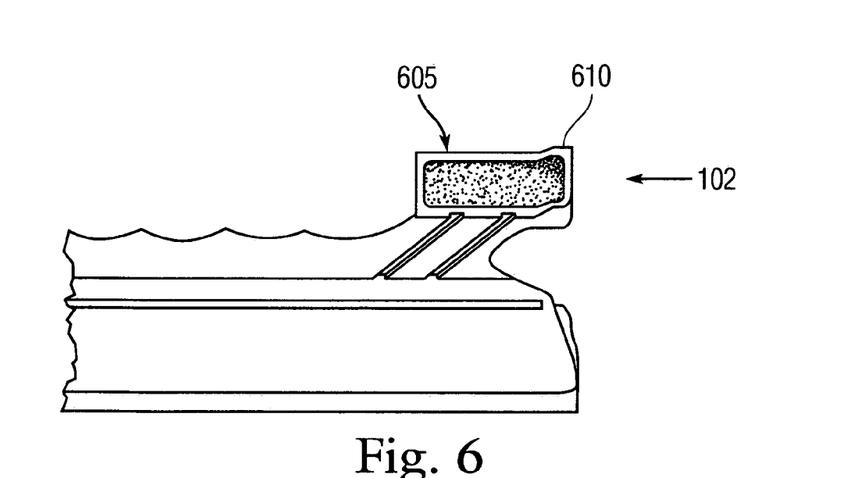
FIG. 6 is an enlarged side view of an exemplary embodiment of the slot element of the attachment mechanism.

Referring to FIGS. 5 and 6, in one embodiment, the bottom 118 of the main body 114 has at least one and preferably a plurality of protrusion(s) 308 for frictional engagement with a projection 610 on the slot element 102. The protrusions 308 and the projection 610 cooperatively limit the distance that the slot element 102 can slide over the extension element 302 and prevent the slot element 102 from backing off the extension element 302. The protrusions 308 extend downward from the bottom 118 of the main body 114, and the projection 610 extends upward from the top surface 605 along the outer edge of the slot element 102. The protrusions 308 are positioned on the bottom 118 so that once the slot element 102 fully engages the extension element 302, the projection 610 is frictionally engaged with the protrusions 308. This engagement prevents the slot element 102 from backing off and stops the slot element 102 from sliding completely over the extension element 302. Preferably, for every extension element 302 and corresponding slot element 102, there is a pair of protrusions 308 on the bottom 118 of the main body 114 and one projection 610 on the slot element 102.

Figure 7:
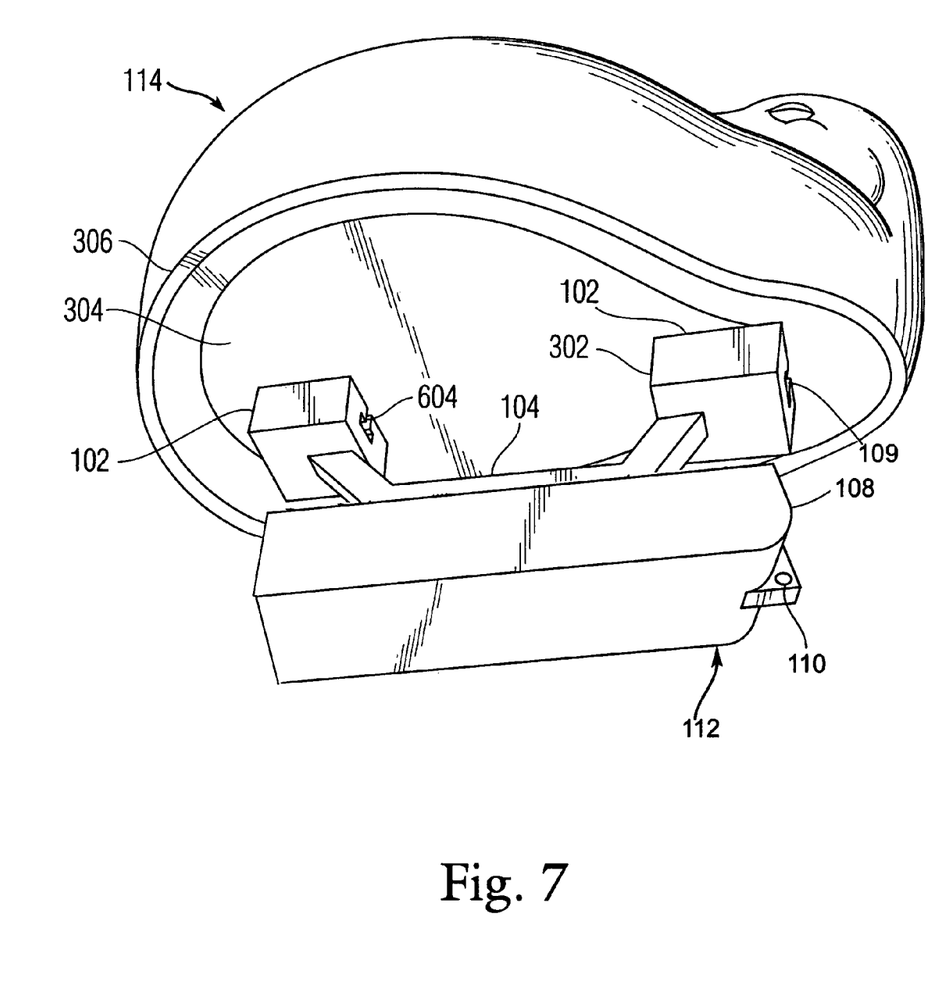
FIG. 7 is an underside perspective view of the waterfowl decoy as in FIG. 1 with keel attached.
Figure 8:
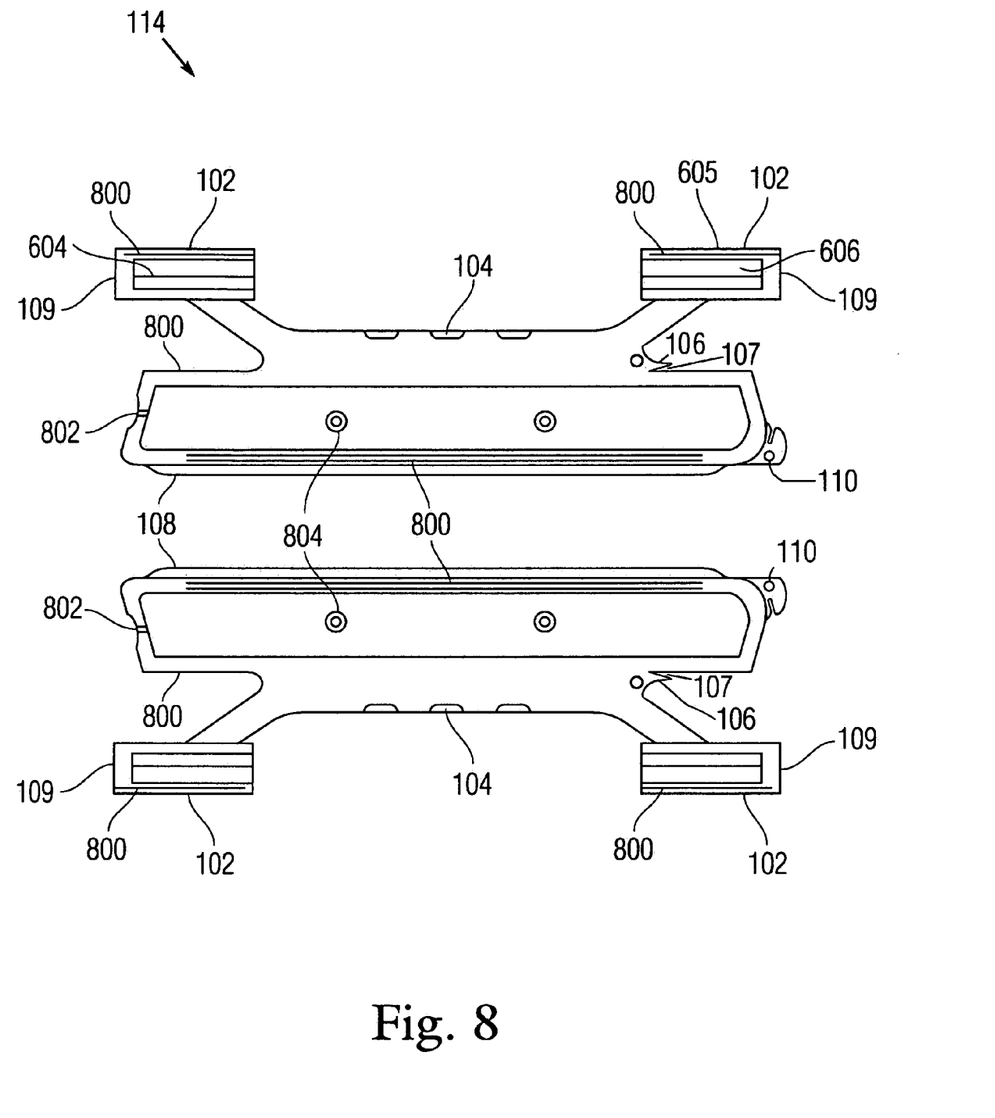
FIG. 8 is a composite view of the two halves of the removable keel.

Referring to FIG. 7, the removable keel 112 is shown attached to the extension elements 302 within the cavity 304 on the bottom 118 of the main body 114. An exemplary embodiment of the removable keel 112 is illustrated in FIG. 8. As shown in FIG. 8, the keel 112 may be constructed from two pieces of molded, e.g., injection molded, plastic or polymer. Suitable polymers include, but are not limited to, Acrylonitrile Butadiene Styrene (ABS). The two pieces are mirror images of each other and are formed together along one of more seam lines 800. Suitable methods for joining the two pieces together include using adhesives, welding, and heat or pressure bonding. In this embodiment, the ballast section 108 comprises a hollow interior 804 for accepting the ballast material. Passing through the wall of the ballast section 108 into the hollow interior 804 is at least one opening 802. The opening 802 allows for the insertion and removal of ballast material. The opening 802 can be closed or sealed using any suitable closure mechanism. In one embodiment, the closure mechanism provides a water tight seal for the opening 802. Suitable closure mechanisms include, but are not limited to, pressure fitted stoppers and threaded plugs.

It should now be apparent that in calm and/or shallow water deployments, the suction bottom decoy may be used without the keel, and alternatively, the keel may be attached easily for strong wind and higher wave conditions.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Specifically, all dimensions cited herein are exemplary as the decoy is scalable and may be produced in different sizes. Therefore, it will be understood that the appended claims are intended to cover all such modifications and embodiments, which would come within the spirit and scope of the present invention.

What is claimed is:

1. A suction bottom decoy with removable keel comprising:
 a main body comprising:
  a bottom arranged to be in contact with a surface of a body of water;
  a cavity on the bottom that extends into the main body to create a suction attachment between the main body and the surface of the body of water, said cavity being defined by a hollow in the main body and a planar rim completely circumscribing said hollow;

a removable keel comprising:
   an attachment mechanism for attachment of said removable keel to said main body portion, said attachment mechanism comprising:
      at least one slot element for sliding engagement with said body portion, said slot element comprising a structure defined by,
         a slot extending lengthwise along said slot element and open on at least a first end of the at least one slot element,
         an aperture narrower than said slot element and extending lengthwise along said slot and providing ingress thereto along the slot element, and
         a projection extending upward from said slot element;
      a bracket connected to the slot element;
      a ballast section affixed distally to the bracket opposite said slot element; and
   at least one extension element protruding from the bottom of the main body within said cavity, inside said rim, and protruding a distance less than the plane of said rim so as not to extend beyond the rim, each extension element comprising a flange having a cross-section in the shape of an inverted T with:
      a first portion that extends downward from the main body for traversing said aperture of said at least one slot element; and
      a second portion protruding transversely across said first portion and held captive in the slot extending lengthwise along said at least one slot element;
   wherein each of said at least one extension elements slidably and frictionally engages a corresponding one of said at least one slot elements to arrest said removable keel in engagement with said main body.

2. The suction bottom decoy with removable keel of claim 1 wherein the main body further comprises a removable head that is rotatably attached thereon.

3. The suction bottom decoy with removable keel of claim 1 wherein said slot of said at least one slot element extends through said at least one slot element from said first end to a second end of said at least one slot element and is open at said first end and at said second end; and said aperture of said at least one slot element is open at said first end and at said second end of said at least one slot element.

4. The suction bottom decoy with removable keel of claim 3 wherein the bracket connects to a central structure, having a greater width near the ballast section and the bracket than at its center, that attaches to the ballast section.

5. The suction bottom decoy with removable keel of claim 4 wherein the central structure further comprises a tang that forms a gap between it and the ballast section for securing an anchor cord after it has been wrapped around the central structure.

6. The suction bottom decoy with removable keel of claim 3 wherein the ballast section comprises:
   a hollow interior;
   at least one opening that passes through a wall of the ballast section into the hollow interior; and
   a closure mechanism that creates a water tight seal for the at least one opening.

7. The suction bottom decoy with removable keel of claim 6 wherein the closure mechanism is either a pressure fitted stopper or threaded plug.

8. The suction bottom decoy with removable keel of claim 3 wherein the ballast section further comprises an eyelet for attaching an anchor cord.

9. The suction bottom decoy with removable keel of claim 3 wherein the main body is constructed of molded polystyrene or other suitable plastics or polymers.

10. The suction bottom decoy with removable keel of claim 3 wherein the removable keel is constructed of Acrylonitrile Butadiene Styrene.

11. The suction bottom decoy with removable keel of claim 3 where the second portion of the at least one extension element further comprises at least one protrusion extending from a top surface of the second portion.

\* \* \* \* \*